United States Patent
Fitz

(12) 
(10) Patent No.: US 6,583,767 B1
(45) Date of Patent: Jun. 24, 2003

(54) TRANSMITTER, RECEIVER AND TRANSCEIVER APPARATUS

(75) Inventor: Stephen M. Fitz, Great Baddow (GB)

(73) Assignee: Radiant Networks PLC, Essex (GB)

( * ) Notice: Subject to any disclaimer, the term of this patent is extended or adjusted under 35 U.S.C. 154(b) by 0 days.

(21) Appl. No.: 09/701,684
(22) PCT Filed: Jun. 8, 1999
(86) PCT No.: PCT/GB99/01805
§ 371 (c)(1), (2), (4) Date: Jan. 19, 2001
(87) PCT Pub. No.: WO99/65162
PCT Pub. Date: Dec. 16, 1999

(30) Foreign Application Priority Data

Jun. 9, 1998 (GB) ............................................. 9812429

(51) Int. Cl.[7] .............................. H01Q 3/24; H04B 1/06
(52) U.S. Cl. ..................................... 343/876; 455/277.1
(58) Field of Search ................................ 343/876, 879, 343/772, 776, 786, 893; 455/277.1, 277.2, 562; H01Q 3/24; H04B 1/06

(56) References Cited

U.S. PATENT DOCUMENTS

| | | | |
|---|---|---|---|
| 5,138,327 A | | 8/1992 | Chang et al. ............... 342/367 |
| 5,193,109 A | | 3/1993 | Chien-Yeh Lee ............ 379/60 |
| 5,313,660 A | | 5/1994 | Lindenmeier et al. ....... 455/135 |
| 5,596,333 A | * | 1/1997 | Bruckert ...................... 342/450 |
| 5,740,526 A | * | 4/1998 | Bonta et al. ............... 455/277.2 |
| 5,826,179 A | * | 10/1998 | Lindermeier et al. ..... 455/277.2 |
| 5,903,826 A | * | 5/1999 | Nowak ....................... 455/277.1 |
| 5,933,788 A | * | 8/1999 | Faerber et al. .............. 455/562 |
| 6,070,064 A | * | 5/2000 | Inamori .................... 455/277.1 |

FOREIGN PATENT DOCUMENTS

| | | | |
|---|---|---|---|
| EP | 0 741 466 A2 | 11/1996 | |
| EP | 0 999 717 A2 | 5/2000 | ........... H04Q/11/04 |
| WO | WO 98/01922 | 1/1998 | |
| WO | 00/25485 | 5/2000 | ........... H04L/12/56 |

* cited by examiner

*Primary Examiner*—Don Wong
*Assistant Examiner*—Trinh Do Dinh
(74) *Attorney, Agent, or Firm*—Pillsbury Winthrop LLP

(57) ABSTRACT

In transceiver apparatus, there is a plurality of sets (A–H) of substantially unidirectional antennae. Each set of antennae has a single radio subsystem for providing a radio output signal for transmission by one of the antennae in the set and for receiving a signal received by one of the antennae to provide an output signal from the radio subsystem. Each of the plurality of radio subsystems has a switch. The switch is operated to switch the output of the radio subsystem to a selected one of the antennae in the set for transmission of a radio signal by said selected antenna and to switch an input of the radio subsystem to a selected one of the antennae in the sets such that a signal received by said selected antenna is passed as an input to the radio subsystem.

7 Claims, 3 Drawing Sheets ered in PCT/GB97/03472 and British patent application 9726873.4, the entire disclosures of which are incorporated herein by reference, there is disclosed a communications apparatus comprising a mesh of interconnected nodes. Each node can communicate with plural other nodes via point-to-point radio links between nodes by means of substantially unidirectional radio transmissions along the links, i.e. signals are not broadcast but are instead directed to a particular node with signals being capable of being passed in both directions along the link. Each node has plural links to other nodes, for example eight links, providing a connection from each node to eight other nodes. In an example, time division duplex (TDD) is used to alternate transmission and reception nodes along a link. In a preferred embodiment, time division multiplexing (TDM) is used to control the timing of transmission and reception between the links. For example, a node is able to transmit along a first link in a first time slot of a transmission portion of a time frame, along a second link during the second time slot of the transmission portion of the time frame, etc., for eight transmission time slots for the eight links. The node then is able to receive along the first link during a first time slot of the reception portion of the time frame, along the second link during the second time slot of the reception portion of the time frame, etc., for eight reception time slots for the eight links. As an alternative to TDD, frequency division duplex (FDD) or other techniques may be used.

TRANSMITTER, RECEIVER AND TRANSCEIVER APPARATUS

BACKGROUND OF THE INVENTION

1. Field of the Invention

The present invention relates to transmitter, receiver and transceiver apparatus.

2. Description of the Related Art

In our International patent application PCT/GB97/03472 and our British patent application 9726873.4, the entire disclosures of which are incorporated herein by reference, there is disclosed a communications apparatus comprising a mesh of interconnected nodes. Each node can communicate with plural other nodes via point-to-point radio links between nodes by means of substantially unidirectional radio transmissions along the links, i.e. signals are not broadcast but are instead directed to a particular node with signals being capable of being passed in both directions along the link. Each node has plural links to other nodes, for example eight links, providing a connection from each node to eight other nodes. In an example, time division duplex (TDD) is used to alternate transmission and reception nodes along a link. In a preferred embodiment, time division multiplexing (TDM) is used to control the timing of transmission and reception between the links. For example, a node is able to transmit along a first link in a first time slot of a transmission portion of a time frame, along a second link during the second time slot of the transmission portion of the time frame, etc., for eight transmission time slots for the eight links. The node then is able to receive along the first link during a first time slot of the reception portion of the time frame, along the second link during the second time slot of the reception portion of the time frame, etc., for eight reception time slots for the eight links. As an alternative to TDD, frequency division duplex (FDD) or other techniques may be used.

Because the radio components of a transceiver are relatively expensive, it was proposed in PCT/GB97/03472 and British patent application 9726873.4 to provide a single radio subsystem at each node with a M-way-switch to switch the radio subsystem between the M links of that node.

Because the links between nodes in the communications apparatus disclosed in PCT/GB97/03472 and British patent application 9726873.4 are point-to-point using substantially unidirectional transmissions for transmission and reception on a link, i.e. signals are not broadcast but are instead directed to a particular node with signals being capable of being passed in both directions along the link, it is important that the antennas of linked nodes be properly and accurately aligned so that transmission from one node to a linked node is properly and completely received. Alignment of the antennas is in practice difficult, especially as the linked node may be a kilometre or more apart from each other. In principle, the nodes to which a particular node is linked may be located in any direction. The number of nodes to which a particular node is linked is also initially unknown. Furthermore, new nodes in any arbitrary location nay be added to the communication apparatus at any time as the communication apparatus develops.

Accordingly, it is beneficial to be able to provide substantially 360° azimuthal transmission and reception coverage at each node and then select only particular directions for actual transmission/reception links with other nodes. This can be achieved by providing more antennas at each node than there are links at that node. For example, where eight links to and from a node are required, it may be convenient to provide thirty-two antennas which together provide 360° coverage in a substantially horizontal plane. For each link direction, at least one of those thirty-two antennas is likely to be facing in the appropriate direction so that particular antenna can be selected for providing a transmission/reception link with a neighboring node.

The problem with providing many antennas at a particular node is that the cost of the switch that is used for switching between the antennas becomes significant. The performance of the switch can also suffer when it is expected to switch between many antennas. This is particularly the case at the high frequencies contemplated for the communication apparatus disclosed in PCT/GB97/03472 and British patent application 9726873.4 in which frequencies of 1 GHz or higher such as 2.4 GHz or 4 GHz or 40 GHz or 60 GHz or 200 GHz or higher are proposed. Also, at these high frequencies, it is important that the apparatus be as small as possible, with the radio components being positioned close to the antennas in order to minimize losses in the couplings.

Accordingly, there is a need for apparatus which provides multiple antennas in which the radio components can be positioned close to the antennas and which provides for switching between the multiple antennas at low cost but with high performance.

SUMMARY OF THE INVENTION

According to a first aspect of the present invention, there is provided transmitter apparatus, the apparatus comprising: a plurality of sets of substantially unidirectional antennas; each set of antennas having a single radio subsystem for providing a radio output signal for transmission by one of the antennas in the set; each of the plurality of radio subsystems having a switch for switching the output of the radio subsystem to a selected one of the antennas in the set to which the radio; subsystem is connected for transmission of a radio signal output by the radio subsystem from said selected antenna.

According to a second aspect of the present invention, there is provided receiver apparatus, the apparatus comprising: a plurality of sets of substantially unidirectional antennas; each set of antennas having a single radio subsystem for receiving a signal received by one of the antennas to provide an output signal from the radio subsystem; each of the plurality of radio subsystems having a switch for switching an input of the radio subsystem to a selected one of the antennas in the set to which the radio subsystem is connected such that a signal received by said selected antenna is passed as an input to the radio subsystem.

According to a third aspect of the present invention, there is provided transceiver apparatus, the apparatus comprising: a plurality of sets of substantially unidirectional antennas; each set of antennas having a single radio subsystem for providing a radio output signal for transmission by one of the antennas in the set and for receiving a signal received by one of the antennas to provide an output from the radio subsystem; each of the plurality of radio subsystems having a switch for switching the output of the radio subsystem to a selected one of the antennas in the set to which the radio subsystem is connected for transmission of a radio signal output by the radio subsystem by said selected antennas and for switching an input of the radio subsystem to a selected one of the antennas in the set to which the radio subsystem is connected such that a signal received by said selected antenna is passed as an input to the radio subsystem.

The present invention in its various aspects allows radio subsystems to be shared between multiple antennas, keeping down the costs, whilst allowing each radio subsystem to be positioned close to the antennas which are served by that radio subsystem. At the same time, the number and complexity of the switches is also optimized to keep down costs whilst ensuring high performance. In the third aspect, each radio subsystem may be arranged to switch between reception and transmission modes using time division duplex.

At least one of the radio subsystems may be arranged to operate at a first frequency for signals input to the radio subsystem from the antennas and at a second frequency for signals output by the radio subsystem to the antennas. Said at least one radio subsystem may be arranged to receive and transmit signals substantially simultaneously.

In any of the aspects mentioned above, the antennas are preferably arranged to provide 360° azimuthal coverage. This greatly facilitates set-up and maintenance of radio transmission links between apparatus according to the present invention.

The antennas are preferably arranged in a circular array in which all of the antennas are directed away from common origin. Again, this greatly facilitates set-up and maintenance of radio transmission links between apparatus according to the present invention.

BRIEF DESCRIPTION OF THE DRAWINGS

Embodiments of the present invention will now be described by way of example with reference to the accompanying drawings, in which.

DETAILED DESCRIPTION

Figure 1:
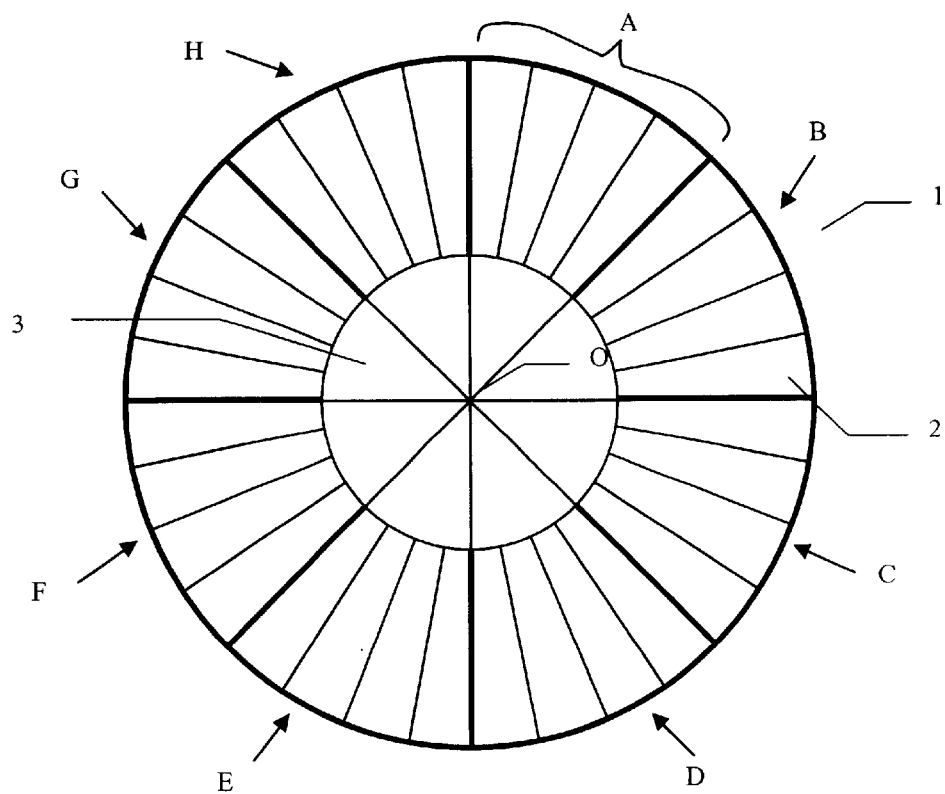
FIG. 1 is a schematic plan view of a first example of apparatus according to the present invention.
Figure 2:
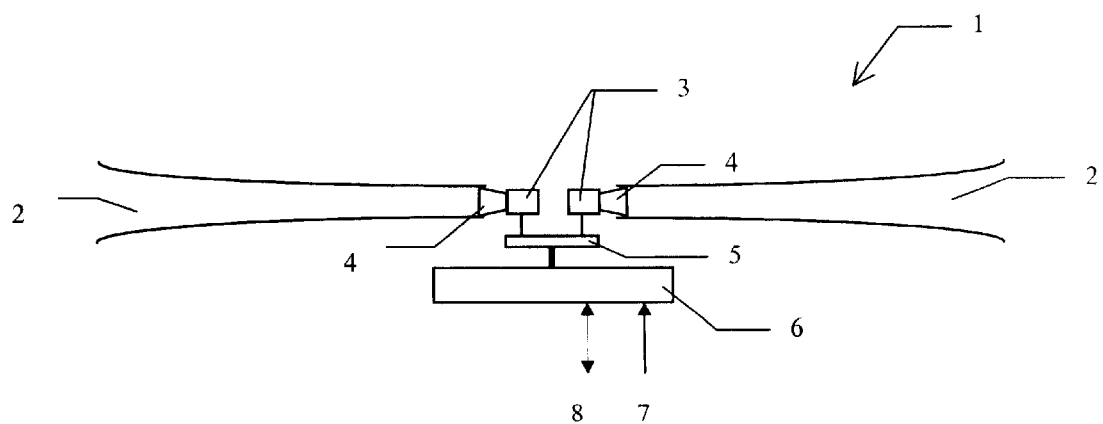
FIG. 2 is a schematic side elevation of the apparatus of FIG. 1 with some of the antennas removed for clarity.
Figure 3:
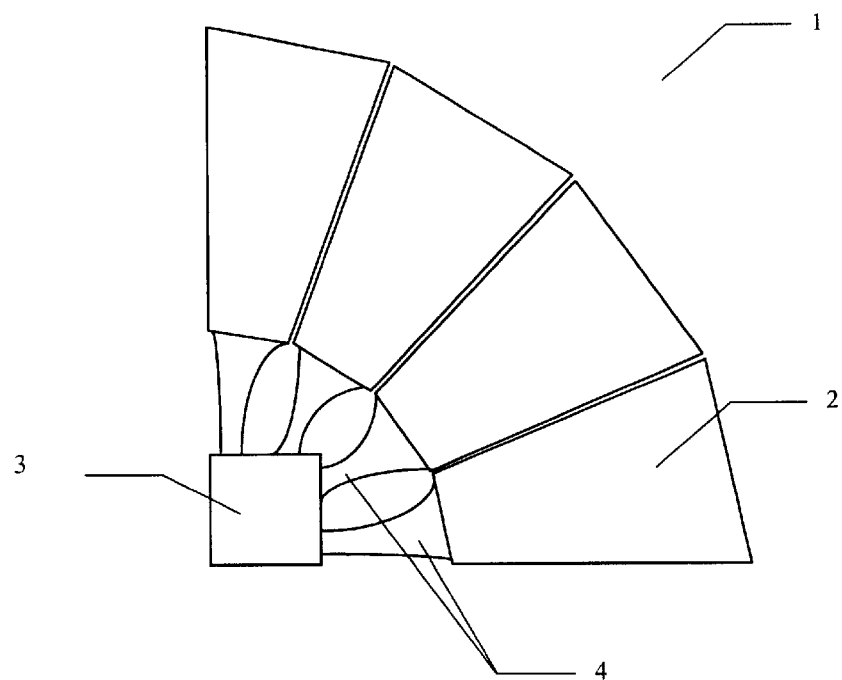
FIG. 3 is a more detailed plan view of a portion of the apparatus of FIG. 1.

Referring to the drawings, and particularly FIGS. 1 to 3, transceiver apparatus 1 includes thirty-two antennas 2. The antennas 2 are arranged in a single plane and are all directed away from a common origin O to provide a circular array of the antennas 2 which therefore provide substantially 360° coverage in the plane in which the antennas 2 lie.

The antennas 2 are grouped into eight sets A–H each consisting of four antennas 2. Each antenna 2 within set A–H is connected to the same radio subsystem 3 at the base of the antenna 2 by means of a suitable connection 4. Thus, a single radio subsystem 3 is provided for each of plural antennas in the apparatus 1. In the specific example, where there are thirty-two antennas 2 divided into eight sets A–H, there are eight radio subsystems 3, i.e. one radio subsystem 3 for each set A–H of four antennas 2. In FIG. 3, four antennas 2 of a set A–H are shown subtending an angle of 90° as a variation to four antennas 2 of a set subtending an angle of 45° as shown in FIG. 1.

The eight radio subsystems 3 are all mounted on a single radio board 5. The single radio board 5 receives an intermediate frequency (IF) signal from an IF subsystem 6. The IF subsystem 6 in turn receives power 7 from a power source (not shown) and transmits baseband signals 8 to and receives baseband signals 8 from apparatus (such as a computer, not shown) associated with the apparatus 1.

Figure 4:
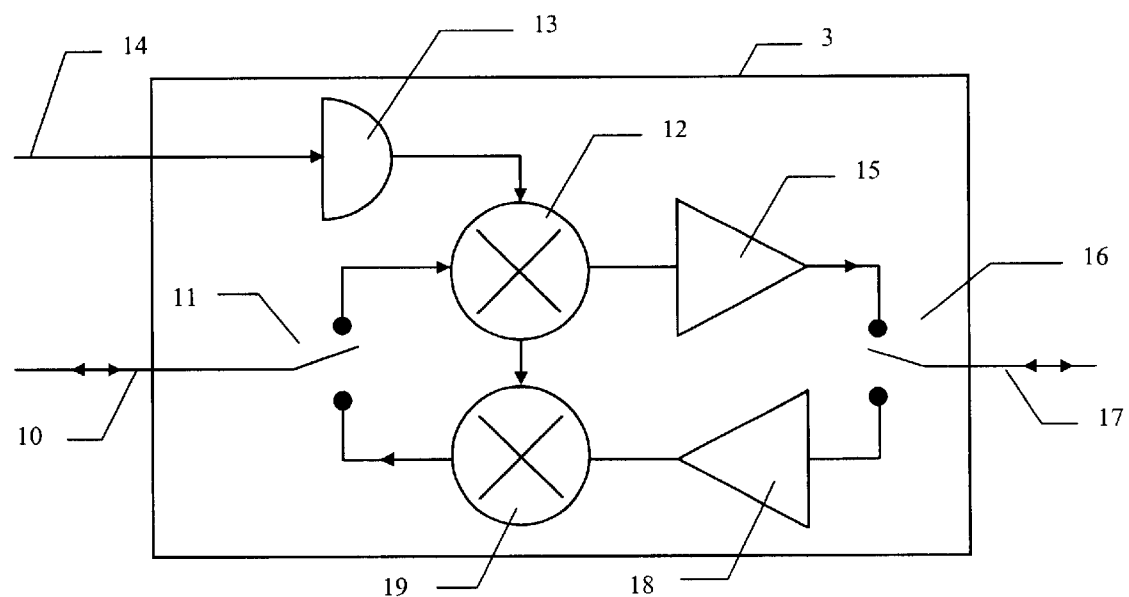
FIG. 4 is a block circuit diagram showing an example of a radio subsystem using TDD.

FIG. 4 shows a radio subsystem 3 in more detail. The radio subsystem 3 shown in FIG. 4 uses time division duplex (TDD) to alternate transmission and reception within a time frame. The radio subsystem 3 is shown in FIG. 4 as configured for transmission.

An input IF signal 10 is passed from the IF subsystem 6 through the radio board 5 to a first switch 11 of the radio subsystem 3. As mentioned above, the radio subsystem 3 is shown in FIG. 4 as configured for transmission. Accordingly, the first switch 11 is set so that the input IF signal passes to a first mixer 12 where it is mixed with a carrier frequency signal from a multiplier 13 which has an input 14 from a local oscillator (not shown.). The output of the first mixer 12 passes to a power amplifier 15 where it is amplified to a power suitable or required for transmission. The output from the power amplifier 15 passes to a second switch 16 which is set so that the amplified signal output by the power amplifier 15 is passed as an output signal 17 from the radio subsystem 3

When the radio subsystem 3 is in reception mode, a received signal 17 passes to the second switch 16 which has been switched to the lowermost position in FIG. 4 so that the received signal 17 is passed to a low-noise amplifier 18. The low-noise amplifier 18 amplifies the received signal and passes it to a down converter 19 which also receives as an input signal the local oscillator input 14 passing via the multiplier 13 and the mixer 12. The received signal is thereby down converted in the down converter 19 to an intermediate frequency signal. The IF signal from the down converter 19 is passed to the first switch 11. The first switch 11 has already been set to the lowermost position in FIG. 4 so that the IF signal passes as an output 10 from the radio subsystem 3. Operation of the first and second switches 11,16 can be under the control of a clock signal passed to the first and second switches 11,16.

It will be appreciated that the switching of the switches 11,16 is synchronized with the expected transmission and reception times for the antenna or antennas 2 to which the radio subsystem 3 is connected according to the time division duplex frame.

Figure 5:
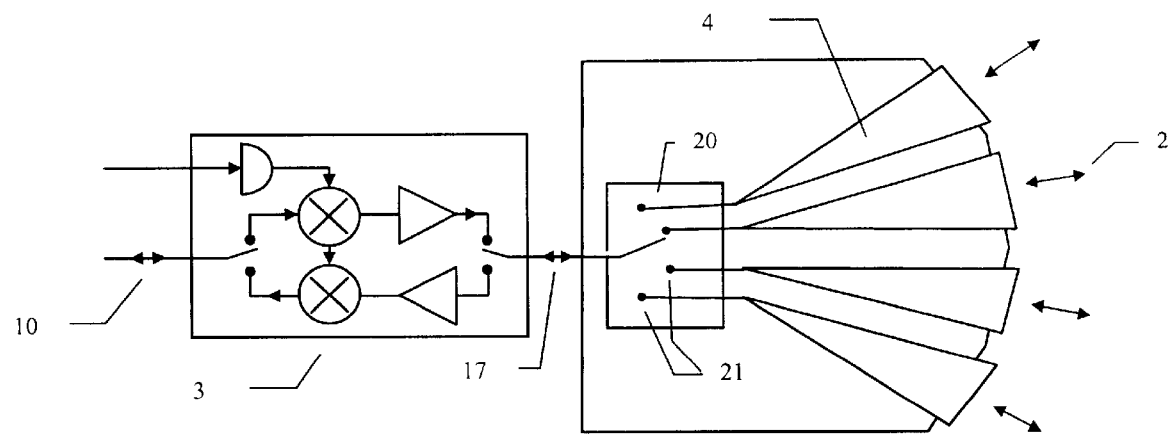
FIG. 5 is a block diagram showing a radio subsystem and a switch.

Referring to FIG. 5, the transmission output/reception input 17 of each radio subsystem 3 is connected to its own radio switch 20. The radio switch 20 can selectively switch the transmission output/reception input 17 of each radio subsystem 3 between one of four input/output connections 21 of the switch 20. Each of the four input/output connections 21 of the switch 20 is connected via an antenna connection 4 to a respective antenna 2.

In a specific example, where the transmission carrier frequency is in the GHz range, the switch 20 and connections 4 to the antennas 2 are implemented by means of a microwave monolithic integrated circuit (MMIC). The connections 4 are designed to allow maximum transfer of RF power between the switch 20 and the antennas 2. It is especially important that the radio subsystem 3 be positioned close to the antennas 2 in such a case. This is because it is important to minimize the length of the connections 4 so as to minimize power losses and interference, as well as making the apparatus 1 as compact as possible. It will be appreciated that a MMIC radio subsystem 3 will typically only be approximately 1 mm by 1 mm in size. Losses in signal strength between the antennas 2 and the radio subsystem 3 can be considerable if the connections 4 are of the wrong geometry or insufficiently compact.

The communications system operator or the users associated with the nodes can install at each node a single apparatus 1 having plural antennas 2 to provide 360° coverage. A set-up procedure can be followed whereby for example the node automatically sends out test signals through each of the antennas 2 in turn by appropriate operation of the radio switches 20 for each set A–H of antennas 2. When the appropriate antenna 2 has been located for transmission and/or reception (i.e. in this example, when a point-to-point radio transmission link with another node has been established through a particular antenna 2), the position of the radio switch 20 can be fixed so that that particular antenna 2 is always selected for transmission or reception out of the four antennas 2 which comprise particular sector A–H. Alternatively, where different antennas 2 within the same sector A–H are to be used for transmission and/or reception at different times, a clock signal to the radio switch 20 can be provided to operate the radio switch 20 so that the correct antenna 2 is selected at the appropriate times. Thus, manual set-up and manual alignment of the antennas 2 can be avoided. The array of antennas 2 can be reconfigured without requiring manual adjustment of the direction of the antennas 2 as the various switches 20 can simply be controlled so that different antennas 2 are selected and used for transmission and reception as required. This is especially advantageous when the communications apparatus is in use as new nodes can be added at any time and will need to be linked to other nodes. Moreover, a link between a particular pair of nodes may be lost for some reason (perhaps because of a temporary obstruction, for example) and the affected nodes can be reconfigured to transmit and receive along links to other nodes via different antennas.

Figure 6:
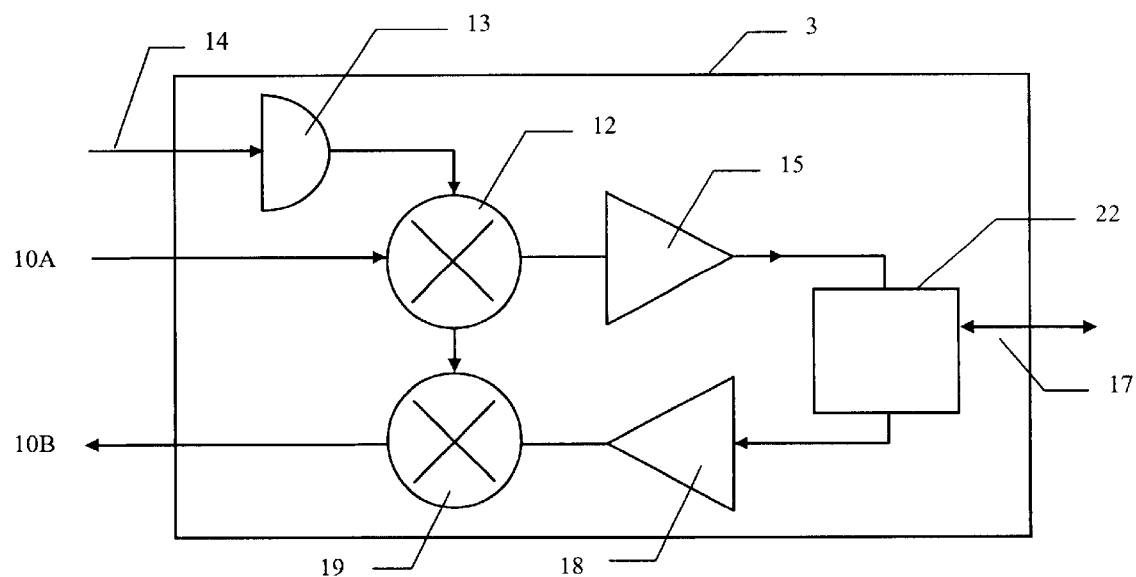
FIG. 6 is a block circuit diagram showing an example of a radio subsystem using FDD.

In FIG. 6, there is shown a radio subsystem 3 which uses frequency division duplex (FDD) to separate transmissions and receptions. Components which are the same as in the TDD radio subsystem 3 shown in FIG. 4 have the same reference numerals.

An input IF signal 10A is passed to a first mixer 12 where it is mixed with a carrier frequency signal having a first frequency $v_1$ from a multiplier 13 which has an input 14 from a local oscillator (not shown). The output of the first mixer 12 passes to a power amplifier 15 where it is amplified to a power suitable or required for transmission. The output from the power amplifier 15 passes to a frequency diplexing filter 22 from where it is passed as an output signal 17 at the first frequency, from the radio subsystem 3. The output signal 17 is passed to a switch 20 as described above with reference to Figure S.

When a radio signal, which is at a different frequency $v_2$, is received at an antenna 2, the received signal 17 passes to the frequency diplexing filter 22. The received signal at frequency $v_2$ is filtered out by the diplexing filter 20 and passed to the low-noise amplifier 18 where it is amplified and passed to the down converter 19. The down converter 19 down converts the received signal at the second frequency $V_2$ and passes the down converted signal as an output 10B from the radio subsystem 3.

The present invention provides low cost but high performance switching between plural antennas 2. Substantially 360° coverage can be obtained without requiring precise manual adjustment and alignment of the antennas 2 simply by operating the switches 20 appropriately. The radio subsystems 3 can be positioned close to the antennas 2, thereby minimizing power losses and interference.

It will be appreciated that, in the specific example described above, there are thirty-two antennas divided into eight sectors A–H of four antennas each. Each sector of four antennas has its own radio subsystem 3 which can be selectively connected to one of the antennas by means of a four-way radio switch. More generally, where there are N antennas to address, this can be achieved with M radio subsystems and M S-way switches where N=M×S.

An embodiment of the present invention has been described with particular reference to the examples illustrated. However, it will be appreciated that variations and modifications may be made to the examples described within the scope of the present invention. For example, as an alternative to TDM, frequency division multiplexing (FDM) or other techniques such as code division multiplexing (CDM) may be used provided that not all antennas are required to be active at any one time so that radio subsystems can be shared and appropriate switches employed. Further, the arrangement of the antennas 2 may be different to that described above and shown in the drawings. For example, there may be thirty antennas 2 arranged in two stacked layers of fifteen antennas 2 each. The antennas 2 of one layer can be rotated by 12° (i.e. half a horn) in a horizontal plane relative to the antennas 2 of the other layer. Other arrangements to provide 360° coverage are possible.

What is claimed is:

1. Transceiver apparatus for use in a mesh of interconnected nodes in which each node comprises said transceiver apparatus and communicates with other nodes in the mesh via point-to-point substantially unidirectional radio transmissions, the apparatus comprising:

a plurality of sets of substantially unidirectional antennas;

each set of antennas having a single respective radio subsystem;

each of the plurality of radio subsystems having a respective switch, each of said switches being constructed and arranged to switch a radio output of its radio subsystem at a particular time instant to one of the antennas in the set to which the radio subsystem is connected so that a radio signal output by the radio subsystem is transmitted by said antenna at said particular time instant, each of said switches being constructed and arranged to switch a radio input of its radio subsystem at another particular time instant to one of the antennas in the set to which the radio subsystem is connected so that a signal received by said antenna is passed as an input to the radio subsystem at said another particular time instant.

2. The apparatus according to claim 1, wherein at least one of the radio subsystems is arranged to switch between reception and transmission modes using time division duplex.

3. The apparatus according to claim 1, wherein at least one of the radio subsystems is arranged to operate at a first frequency for signals input to the radio subsystem from the antennas and at a second frequency for signals output by the radio subsystem to the antennas.

4. The apparatus according to claim 1, wherein the antennas are arranged to provide 360° azimuthal coverage.

5. The apparatus according to claim 1, wherein the antennas are arranged in a circular array in which all of the antennas are directed away from a common origin.

6. A node for use in a communications apparatus comprising a plurality of nodes wherein each node is capable of communicating with plural other nodes via point-to-point wireless transmission links between the nodes, the node comprising:

a plurality of sets of substantially unidirectional antennas, each set of antennas having a single respective radio subsystem; each of the plurality of radio subsystems of said node having a respective switch, each of said switches being constructed and arranged to switch a radio output of its radio subsystem at another particular time instant to one of the antennas in the set to which the radio subsystem is connected so that a radio signal output by the radio subsystem is transmitted by said antenna at said particular time instant, said switch being constructed and arranged to switch a radio input of its radio subsystem at another particular time instant to one of the antennas in the set to which the radio subsystem is connected so that a signal received by said antenna is passed as an input to the radio subsystem at said another particular time instant;

whereby the direction of transmission from said node to another node in the communications apparatus is determined by switching to the appropriate antenna of said node and whereby the direction from which radio signals are received from said node from another node in the communications apparatus is determined by switching to the appropriate antenna of said node.

7. A communications system, comprising:

a plurality of nodes, each node being capable of communicating with plural other of said nodes via point-to-point wireless transmission links between the nodes;

at least some of said nodes each comprising a plurality of sets of substantially unidirectional antennas, each set of antennas having a single respective radio subsystem;

each of the plurality of radio subsystems of said at least some of said nodes having a respective switch, each of said switches being constructed and arranged to switch a output of its radio subsystem at a particular time instant to one of the antennas in the set to which the radio subsystem is connected so that a radio signal output by the radio subsystem is transmitted by said antenna at said particular time instant, said switch being constructed and arranged to switch a radio input of its radio subsystem at another particular time instant to one of the antennas in the set to which the radio subsystem is connected so that a signal received by said antenna is passed as an input to the radio subsystem at said another particular time instant;

wherein a direction of transmission from one of said at least some of said nodes to another node within said plurality of nodes is determined by switching to the appropriate antenna of said at least one node; and wherein a direction of reception at one end of said at least some of said nodes from another node within said plurality of nodes is determined by switching to the appropriate antenna of said at least one node.

* * * * *